March 12, 1935. P. S. DENNING 1,994,066
COLORED PREPARED ROOFING
Filed Aug. 4, 1930

Inventor
Paul S. Denning
By Gibson, Mann & Co.
Attys.

Patented Mar. 12, 1935

1,994,066

UNITED STATES PATENT OFFICE 1,994,066

COLORED PREPARED ROOFING

Paul S. Denning, Joliet, Ill., assignor to Frederic E. Schundler, Joliet, Ill.

Application August 4, 1930, Serial No. 472,958

1 Claim. (Cl. 91—68)

The objects of the invention are to provide a brilliant coat of color upon the prepared roofing; to reduce the amount of coloring material hitherto necessary; to make possible a more flexible manufacturing procedure; and to reduce the cost of coloring prepared roofing.

Figure 1:
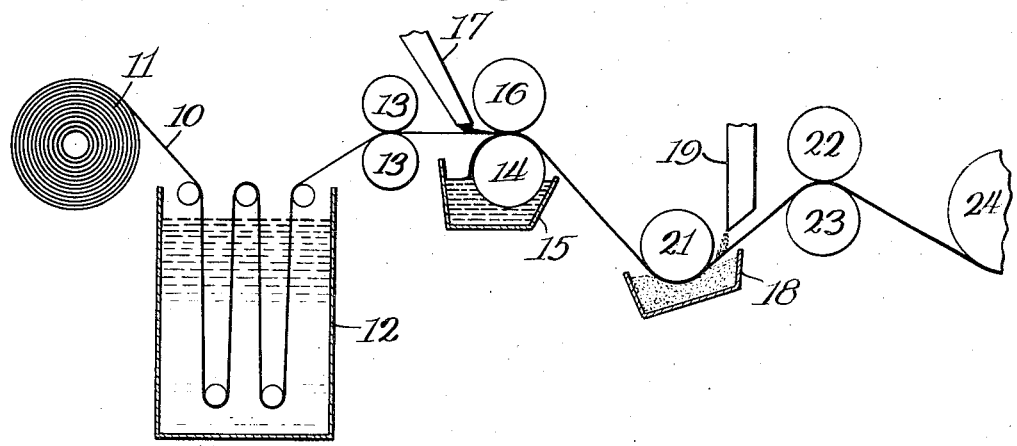
Figure 1A:
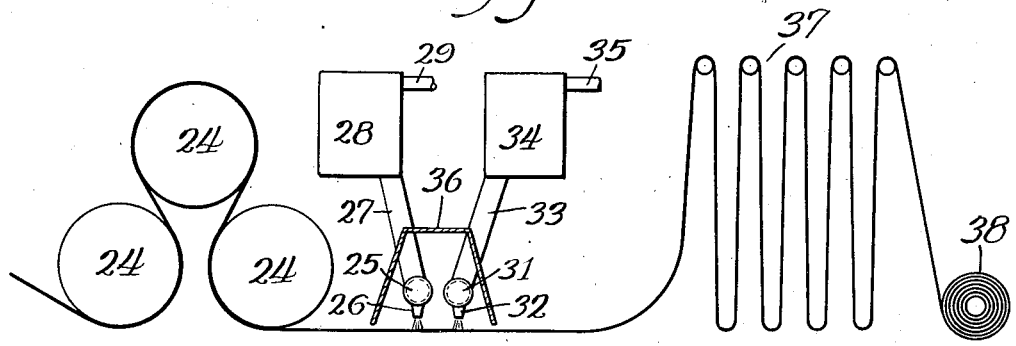

These and other objects of the invention will become apparent as the description proceeds and the specification is read with reference to the drawing in which Figs. 1 and 1—A are a diagrammatic showing representative of a continuous process for making colored prepared roofing.

It has long been customary to surface prepared roofing by applying to the coated felt base some adhesive agent such as asphalt and embedding in the asphalt granules of crushed rock. Since brilliant colors on buildings are more and more used, there is a distinct demand that the colors of prepared roofing should be brilliant. Natural rocks which are available do not have sufficiently brilliant color, consequently it has become customary to coat the granules with powdered mineral colors and bond the color to the granule by some form of cement.

This process is open to the objection that it is frequently necessary to heat the cement in order to set it. The brilliantly colored mineral powders are often the hydrated form of the metallic molecule which heat partially destroys. Further, the entire surface of the granule must be coated and, since a relatively small portion is exposed and the rest embedded in asphalt, a considerable proportion of the color is actually lost. This is serious because of the cost for it must be remembered that the brilliant powdered pigments are usually salts of relatively expensive heavy metals.

The other objection to the process of embedding colored granules is that the color is toned down by the background of the asphalt since small areas of black show, and it is not possible to produce as brilliant a color as could be desired.

The method herein illustrated discloses a means of coloring prepared roofing which requires much less pigment than when the granules are all individually coated. It also covers up the black asphalt areas so that a very brilliant roofing is produced. Further, since a color coating is applied directly to the sheet after most of the operations in manufacture have been completed, it simplifies the manufacturing procedure. A standard grade of relatively inexpensive crushed rock may always be applied to the roofing without reference to the color which will later be produced.

Figs. 1 and 1—A illustrate the manufacture of this roofing. A felt sheet 10 is wound off of the roll 11 into the saturator 12 where the sheet is properly waterproofed. It is drawn from the saturator by the squeeze and feed rolls 13 and into the coater where a roll 14, revolving in a tank of melted asphalt 15, spreads a coat of asphalt upon the under surface of the felt. The roll 16 spreads a like coating upon the upper surface. The asphalt forming the upper coating is fed to the sheet and the roll through the spout 17. From the coater, the hot sheeting is run to the mineral coater where a layer of powdered material, such as talc or sand, is spread upon the under surface and the granules of crushed slate or other rock are spread out upon and rolled into the upper surface. The material for coating the back of the sheet is held in the pan 18 and the granules are fed through the spout 19. The roll 21 holds the felt in proper position during this operation.

From the mineral coater the felt sheet passes between the pressure rolls 22 and 23 and then over the water-cooled cooling rolls 24—24.

The diagram indicates three water-cooled rolls only. Many rolls, however, are often used. When the sheet has been sufficiently chilled by the cooling rolls, it passes under a transverse pipe 25 supplied with a series of spray heads 26. The pipe is connected through the conduit 27 to a lacquer reservoir 28 and the latter receives energy from a compressed air line 29. When it is desired to apply two colors to the roofing, a second transverse pipe 31, supplied with spray nozzles 32 connected by conduit 33 to the pressure tank 34, is used. In such a case, the spray heads 32 are staggered with reference to the spray heads 26 and the application of pressure through the air pipes 29 and 35 may be alternated by an automatic valve. If more than two colors are wanted, the apparatus is again duplicated.

The spray apparatus is covered by a hood 36 connected to a suitable exhaust fan, not shown, so that the vapors from the solvents may be removed. The hood may extend for a considerable distance so that practically all of the vapor released by the drying of the lacquer may be exhausted through the fan. The roofing then runs through a looper 37 into the packaging roll 38 where packages suitable for use in the trade are made up.

In the application of lacquer to prepared roofing care must be taken that the lacquer solvent must not be a solvent for the asphalt, otherwise much of the protective coat of asphalt would be ruined. Some of the asphalt would be dissolved and its intense black pigment would spread throughout the whole color coat.

I have discovered that a suitable solvent which does not affect the asphalt is denatured alcohol, providing that the denaturant does not have petroleum derivatives therein. A suitable bonding agent is rosin.

A typical mixture which will produce a brilliant color is as follows:

Twenty per cent rosin is dissolved in commercial alcohol and the mixture is tinted to the desired degree by the addition of chromium oxide and "Iron Green". This will produce a satisfactory green lacquer. Reds may be secured by the addition of high grade haematite and, in fact, any of the common mineral paint pigments may be used.

The advantages of the process are that no more of the expensive pigment is required than will coat the surface of the roofing. The asphalt itself, as well as the granules, is also colored which makes the roofing very brilliant. The coating is durable and the lacquer coat has no deleterious effect whatever upon the protective asphalt coats.

I do not limit myself to rosin and alcohol for it is obvious that many artificial or natural resins could be used. It is required only that the resin be reasonably waterproof and soluble in a substance which cannot dissolve the asphalts in the coating.

A great flexibility and output may be realized since the roofing may be made any color desired merely by changing the colors in the lacquer tanks.

I claim as my invention:

A prepared roofing comprising a foundation felt impregnated with an asphaltic compound and coated with a bituminous material and having a layer of granules embedded on one surface thereof, and a thin adherent coating over an entire surface of the roofing including the exposed surface only of the granules, said coating consisting only of color pigment and a resin.

PAUL S. DENNING.